United States Patent Office 2,990,016
Patented June 27, 1961

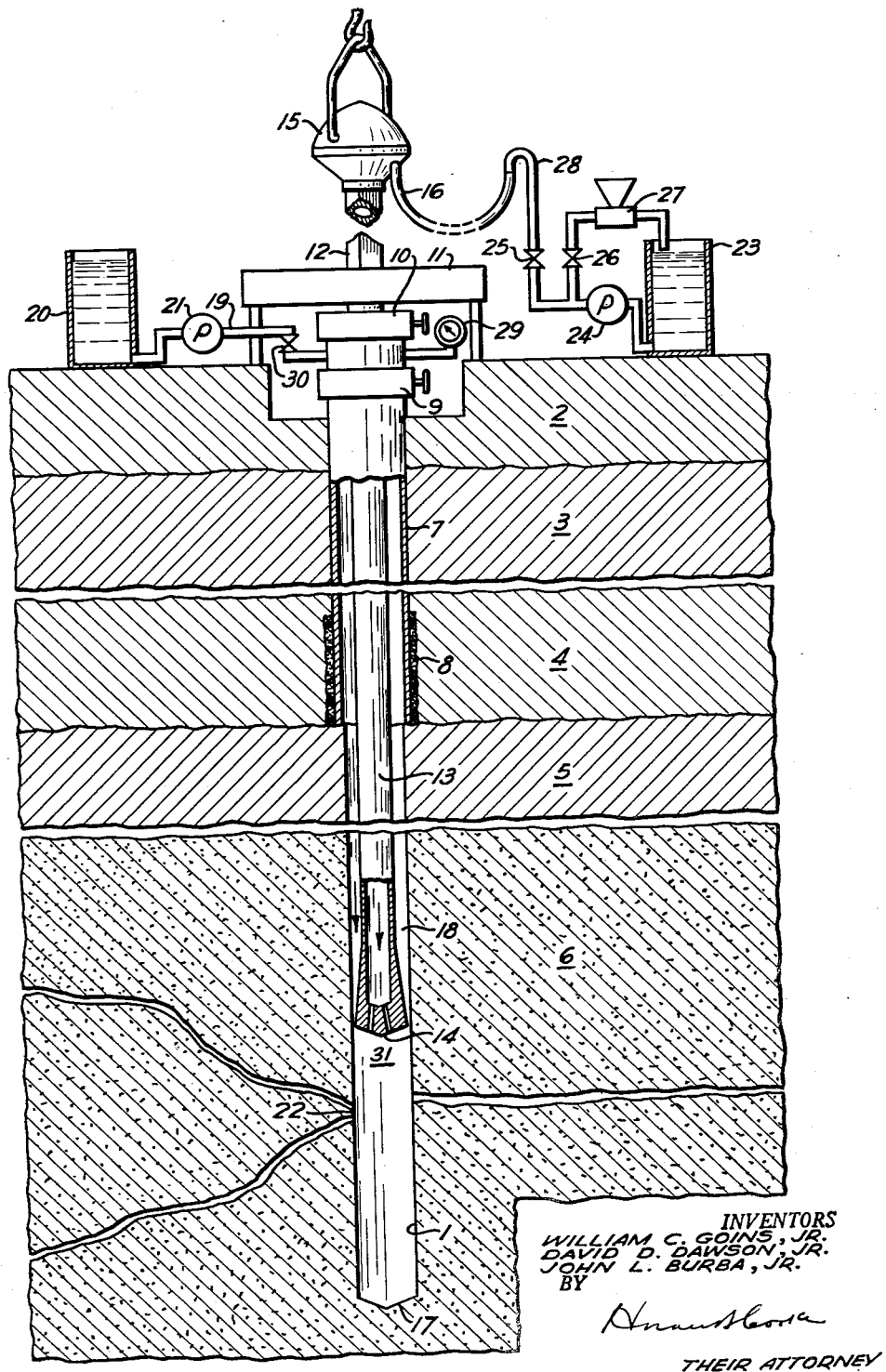

2,990,016
METHOD OF AND COMPOSITION FOR SEALING LOST CIRCULATION IN WELLS
William C. Goins, Jr., Bellaire, and John L. Burba, Jr., Odessa, Tex., and David D. Dawson, Jr., London, England, assignors to Gulf Oil Corporation, Pittsburgh, Pa., a corporation of Pennsylvania
Filed Feb. 26, 1957, Ser. No. 642,457
12 Claims. (Cl. 166—29)

This invention concerns a method of and composition for curing the condition known as lost circulation when encountered in the drilling of boreholes, and in particular concerns a method of correcting and/or sealing such circulation losses by delivering to the region of circulation loss a hydratable substance in an inert liquid carrier and simultaneously delivering to the region a liquid which is mixed with the hydratable substance to effect the hydration. The composition thus produced is then forced into the zone of circulation loss to effect a seal.

In the drilling of boreholes for the production of petroleum, it is not uncommon to drill to depths exceeding 10,000 feet. Furthermore, since petroleum occurs in sedimentary rocks, these boreholes frequently encounter sedimentary strata which while commonly termed rock formations, are often very friable and unable to withstand any substantial stresses other than that of compression. Formations incapable of withstanding shear or tensile stresses, and formations of the cavernous type having large openings or solution channels are referred to in this application as incompetent formations.

It is customary in drilling oil wells to employ a viscous drilling fluid which is commonly pumped down the drill stem, and returned upwardly to the surface through the annular space between the outside of the drill stem and the borehole wall. The purpose of the drilling fluid is to lubricate and cool the drill, and to carry the cuttings and disintegrated rock particles to the surface where they are removed from the drilling fluid by screens, whereare removed from the drilling fluid by screens, whereupon the drilling fluid may be reused or circulated.

Drilling fluids often contain expensive chemicals and weighting materials whose purpose is to maintain the density of the drilling fluid sufficiently high so that its hydrostatic pressure slightly overbalances the formation pressures. Thus, if a high-pressure gas or oil formation is encountered, the drilling-fluid pressure will prevent entrance of the formation fluids into the borehole until the well is put on production. A slight deficiency in drilling-fluid pressure may allow formation fluids to enter the well whereupon the pressure of the drilling fluid column is further reduced and the well may go out of control. As the excess pressure of drilling fluid forces liquid to enter the various porous formations encountered in the course of the drilling a filter cake is formed on the borehole wall due to the filtering out thereon of the solid materials contained in the drilling fluid. This filter cake acts to prevent further filteration of liquid from the drilling mud into the formation and subsequent sloughing of the borehole wall.

It is apparent that the hydrostatic pressure of the drilling fluid standing in the well bore increases linearly with depth. Formation pressures also increase with depth but somewhat irregularly. By adjusting the density of the drilling fluid through the addition of weighting materials, it is possible to effect substantially a balance between the drilling-fluid pressure and the formation pressure at a given depth, generally the bottom of the hole. When a high density mud has been used to counteract unusually high pressures encountered or anticipated at deep formations, the differential of hydrostatic drilling-fluid pressure over formation pressure is greatest at some depth above the bottom of the hole. Because of the great depth of some wells, a very slight increase in density of drilling fluid will result in substantial differential pressures. Furthermore, it is known that manipulation of the drill stem in the long and narrow confines of the borehole further produces pressures which may at times add to this differential. If a large differential pressure occurs in an incompetent formation, the latter may be broken down whereupon drilling fluid is lost in the formation. We have found that lost circulation in the Gulf Coast area usually occurs off bottom where the pressure differential is greater and the formation weaker than at the bottom of the hole.

Consequently, when the drill is drilling in or below an incompetent formation incapable of withstanding the pressure differential the formation may break with the resultant production of fractures or cracks which form channels or openings leading away from the borehole. In these incompetent formations, and also in formations of the cavernous type, the openings are of a different order of magnitude than the openings in the usual permeable formations. The openings are large enough to allow the solids in the drilling fluids as well as the liquids to enter the formation. This is in contrast with the loss of liquid into permeable formations in which the solid particles in the drilling fluid are filtered out at the face of the formation to form a filter cake at the borehole wall. Whole drilling fluid will immediately enter these fissures and be lost, that is, it does not return to the surface, and this condition is known as lost circulation. Lost circulation may be defined as a loss in drilling fluid to surrounding voids, such that either considerably smaller quantities of whole drilling fluid are returned to the surface or drilling fluid is pumped down into the borehole and completely fails to return. Whenever highly permeable or cavernous formations are penetrated or ruptures occur in the borehole, the drilling fluid may be lost through these openings in the manner above described, and circulation is either partially or completely stopped. It then becomes imperative that these openings be immediately and effectively sealed if further drilling is to be done.

In view of the large quantities of drilling fluid involved and the ease with which it enters a formation once the latter is broken down by excessive pressure, the condition known as lost circulation may prove to be a very expensive one. Accordingly, many methods have been proposed for its prevention and/or correction. All such methods have not proved successful in all cases. One common method of correcting such a condition is to form a cement plug in the hole, preferably after underreaming at the location desired, and then drilling through the cement plug. However, such a cement plug is relatively rigid and its properties do not conform to the characteristics of the surrounding formations. Therefore, it may subsequently break down and frequently an expensive recementing operation is required. Furthermore, when one attempts to drill through such a cement plug, the fact that the cement is much harder than the surrounding rock often causes the drill to become deflected, with the result that the new hole does not go straight through the cement plug. Such a cement plug may in fact completely side-track the hole below it. Therefore, this method of correcting circulation losses leaves much to be desired.

Another method used in attempting to correct lost circulation is to use well-known fine, coarse, fibrous or lamellar plugging or bridging materials which are suspended in the drilling fluid and pumped to the point of loss. Among such materials used are cellophane strips, bagasse, flax fibre, cottonseed hulls, balsam and redwood fibre, sawdust, feathers, ground plastic, ground limestone, and many others. These techniques have proved only moderately successful, usually being effective only when the openings in the formation are not more than about 0.1 inch in diameter. In some instances the fractures in incompetent formations may be as large as 0.5 inch in diameter.

We have found that our invention is successful in correcting the condition of lost circulation in a large number of instances, and have found it to be especially effective when the condition is encountered in incompetent formations such as are found in the Gulf Coast area.

It is accordingly an object of our invention to provide a method of and composition for correcting the condition of lost circulation when encountered in the drilling of boreholes.

It is another object of our invention to provide a method of and composition for sealing off circulation losses in incompetent formations encountered in the drilling of boreholes.

It is still another object of our invention to provide a method of and composition for sealing off circulation losses which does not seriously interfere with subsequent drilling and which effectively seals off fractured formations to which drilling fluid may otherwise be lost.

Our invention achieves the above objects by pumping a concentrated slurry of a hydratable material in an inert carrier liquid down the borehole through one well channel and substantially simultaneously pumping an aqueous liquid through a second well channel. The two liquids are mixed in the borehole adjacent to the formation causing loss of circulation to hydrate the hydratable material partially. The stiff sealing composition formed by the partial hydration is squeezed into the formation causing loss of circulation wherein further hydration of the hydratable material causes it to swell and harden to close the fissures.

One way in which the process of our invention may be carried out is illustrated in the drawing whose figure is a diagrammatic representation of the cross-section of a borehole with equipment which may be used in the application of our invention to the borehole. In the drawing, 1 represents the borehole which penetrates earth formations 2, 3, 4, 5 and 6. Formation 6 is represented as a loosely consolidated, incompetent sand. The upper part of the hole may be cased with casing 7 cemented in place by cement 8 in conventional manner. At the top of the casing there may be a casing head with blow-out preventers 9 and 10. Above this is situated the rotary table 11 which is powered in conventional manner and has a Kelly bushing (not shown) to drive the kelly 12. The kelly is connected to the drill pipe 13 whose lower end may carry a drill bit 14. The entire drill-pipe assembly is suspended from the swivel 15 which in turn is carried by the conventional hoisting mechanism and derrick (not shown). A hose 16 connects to the swivel and through it fluid may be pumped down through the hollow kelly and drill pipe to be delivered at bit 14.

In the drilling operation prior to the application of our invention as shown in the drawing and with the bit drilling at the bottom 17 of the hole, drilling mud was being circulated as is customary in the drilling process. The drilling mud was pumped through hose 16 down the interior of the drill stem to the bit 14 at the bottom of the hole, whence it returns to the surface through the annular space 18 surrounding the drill stem, discharging through pipe 19 to the mud pit (not shown) in conventional manner. During this drilling operation it was found that, although drilling mud was being pumped down through the drill stem, no mud was being returned to the surface through the annular space and pipe 19, thus showing that the formation had at some point broken down so as to permit loss of circulation.

In order to determine the point of circulation loss, the drill pipe 13 was removed from the hole and a flow survey was made on the well. The latter survey comprises lowering into the well a known type of flow meter which records at the surface and which measures flow of fluid past the device. For this purpose an impeller type or spinner type of flow meter is preferred. In making the flow survey, the flow meter is lowered through the blow-out preventers 9 and 10, preventer 9 being left open, and preventer 10 being closed around the cable leading down the well to the instrument. With valve 30 open, drilling mud from tank 20 is pumped by the pump 21 into the well through pipe 19, so that a small flow of mud is maintained, which mud slowly flows down the hole to the point of circulation loss and thence into the formation. The flow meter or spinner survey will indicate this flow when the device is above the point of loss, but upon being lowered past the point of loss it will no longer show such indication. In this manner the depth of the zone of circulation loss is determined. For purpose of illustration in the drawing, it is assumed that the point of circulation loss has been determined by such a survey to be in the region indicated in the drawing at 22. The pump 21 is then stopped and blow-out preventer 10 opened whereupon the flow meter is removed from the hole.

The well is then connected as illustrated in the drawing. The drill pipe is re-inserted into the hole either with or without bit 14 to a depth slightly above the previously determined zone 22 of circulation loss. Preventer 10 is closed around the drill pipe and 9 is left open. Tank 20 contains an aqueous fluid which is later to be pumped by means of pump 21 and pipe 19 into the annular space between the casing 7 and drill pipe 13. The drilling fluid in use in the well is the one that is customarily used. Any type of water-base drilling fluid may for this purpose be used in our invention, i.e. fresh water, salt water, fresh water mud with organic or complex phosphate thinners, lime-treated muds, sodium-silicate muds, or muds containing emulsified oil. All these perform adequately in supplying water which acts as a hydrating agent in our invention.

A second tank 23 is connected through pump 24 and valve 25 to the hose 16 so that after preparation of a mixture, termed the squeeze mixture, the contents of tank 23 may be pumped down the interior of the drill pipe 13 and spotted at the end of the drill pipe. A second conduit which includes valve 26 may connect the pump 24 to a conventional cement-mixing hopper 27 which discharges back into tank 23. By means of the latter circuit the squeeze mixture which is to be spotted at the end of the drill pipe may be prepared in tank 23. The squeeze mixture comprises a concentrated suspension of hydratable material in an inert carrier liquid which will not hydrate the material. The squeeze mixture is prepared in the following preferred manner.

Into the tank 23 is placed a quantity of an inert carrier liquid. For the purpose of this invention any liquid may be used which is non-aqueous. Such liquids as alcohols, for example isopropyl alcohol, or petroleum oils, either of the crude or refined variety, may be used. We have found diesel oil to be very satisfactory and prefer this type of petroleum oil because of its low viscosity combined with low cost. It is easily obtainable since it is commonly used for fuel at the drilling rig. The hydratable material is charged into the mixing hopper 27. The term hydratable material is used to designate any material which upon mixing with water will thicken to form a stiff highly viscous mass which can be squeezed into the fissures in the incompetent formation, and which will thereafter continue to hydrate to form a hard mass sealing the formation. It is preferred that the hydratable material will swell upon hydration. By way of example, dehydrated clay may be used. We prefer to use bentonite and have found this material particularly advantageous for the purpose of our invention. By way of example, in our invention we have successfully used Wyoming bentonite, such as that available to the industry as a drilling fluid admix. Other hydratable materials which can be used are Portland cement and plaster of Paris, used either alone or in combination with dehydrated clays or bentonite. With valve 25 closed and valve 26 open, the inert liquid from tank 23 is pumped through the mixing hopper 27 and back to tank 23. The mixture gradually becomes thicker as bentonite is added until a thick, but still pumpable, slurry is obtained. We have found that a concentration of about 300 pounds of bentonite per barrel of diesel oil gives satisfactory results. This is equivalent to 2.7 barrels of bentonite for each 7.3 barrels of diesel oil (total 10.0 barrels of the mixture).

In preparing the squeeze mixture in tank 23, a mixture approaching the maximum concentration of hydratable material that can be handled by the pumps and equipment is ordinarily prepared. The concentration of bentonite in the squeeze mixture may range from about 100 to about 400 pounds of bentonite per barrel of diesel oil. A given amount of bentonite is most effective if used in a highly concentrated slurry, giving firmer seals containing more reserve hydratable material so that if subsequent leaks should occur they will become self sealing. The concentration which has been found to be most satisfactory is from 250 to 300 pounds of Wyoming bentonite per barrel of diesel oil. Pellet-size bentonite may be used in all or in part of the suspension, and the inclusion of pellets of bentonite is advantageous in that the squeeze mixture remains pumpable with higher concentrations of solids.

Our invention does not preclude the use of conventional fine, coarse, fibrous, bridging, or lamellar sealing or plugging agents if desired. Such sealing agents as ground mica, cellophane, etc., may be added to the squeeze mixture in tank 23. Furthermore, if desired, the density of the mixture may be raised through the addition of ground barytes or similar material of high gravity. After the squeeze mixture of bentonite and diesel oil has been thoroughly mixed, the valve 26 is closed and valve 25 opened.

The annular space 18 as well as the drill pipe 13 is completely filled from tank 20 by means of pump 21 with valve 30 open. The well is then ready for the application of our invention whereby the circulation loss at point 22 is sealed in the following manner. If necessary, the density of the drilling fluid in the annulus may be reduced to keep the annulus full.

With the drill pipe 13 in the hole and ending a short distance, preferably not more than 100 feet, above the previously-determined zone 22 of circulation loss, three or more barrels of plain diesel oil are pumped into the drill pipe ahead of the mixture from tank 23 in order to prevent mixing of the mud and squeeze mixture in the drill pipe or tubing. The squeeze mixture from tank 23 is started by pump 24 into the drill pipe through valve 25, conduit 28, hose 16, swivel 15, kelly 12 and thence into pipe 13, at the same time allowing the drilling fluid in the annular space 18 to be displaced out by way of the flow line 19 in the manner of conventional circulation. Pumping of the squeeze mixture from tank 23 is continued until the mixture arrives at the bottom of the drill pipe, this being indirectly determined by measuring from tank 23 and knowing the inside dimensions of the pump and tubing system.

When the squeeze mixture from tank 23 arrives at the lower end of the drill pipe, pump 21 is started and forces the aqueous drilling fluid from tank 20 through pipe 19 and valve 30 into the annular space 18. Upon reaching the lower end of the drill pipe, the squeeze mixture coming down the drill pipe and the aqueous drilling fluid coming down the annular space will commingle at 31 in the borehole above the point 22 of loss. The rates of pumping the squeeze mixture and the aqueous drilling fluid are adjusted to control the proportions in which the two liquids are mixed. It is important that the amount of water in the mixture be less than the amount required to completely hydrate the hydratable material. The maximum ratio of squeeze mixture to aqueous fluid which is the highest ratio that will result in sufficient thickening of the squeeze mixture to prevent it being lost in the incompetent formation in the manner of the drilling fluid and will allow pressure buildup to form a tight seal, is about 10:1 by volume. We have found it preferable to adjust the speeds of pumps 24 and 21 so that about four barrels of squeeze mixture are introduced by pump 24 for every barrel of drilling fluid introduced by pump 21. The speed of pumping may initially be from 2 to 4 barrels per minute, followed by slower pumping as the squeeze pressure increases.

As a result of the commingling, the squeeze mixture partially hydrates in the borehole forming a thick composition of lumpy consistency, which with continued pumping is squeezed back into the region 22 of circulation loss. This process of coordinated mixing of squeeze mixture and drilling fluid and forcing into the region 22 is continued until all of the mixture from tank 23 has been introduced, after which it is again followed by a slug of about three barrels of diesel oil. The final displacing of the squeeze mixture down to the lower end of the drill pipe may be done with drilling fluid. If desired, further downward displacement of the sealing composition comprising the commingled mixture and drilling fluid below the end of the drill pipe may be accomplished by pumping in additional drilling fluids.

When the squeeze is completed the pumps are shut down and valve 25 in the drill pipe and valve 30 leading to the annular space are closed without releasing the well-head pressure that has been built up during the squeeze. The composition is allowed to set for 2 to 3 hours during which time it develops strength from the hydration which occurs to the bentonite from the commingled water-base drilling fluid.

After the composition has been allowed to set the desired length of time, the hole is then reamed to size by drilling to a point below the zone of loss. The hydrated squeeze mixture in the hole is easily drilled. If it is desired to test the seal, pump pressure is then applied to the hole in an amount such that when added to the mud pressure at the point of loss, the combined pressures equal the pressure of the mud column which it is desired to carry in subsequent drilling. The well-head valves are again closed and the rate at which the pressure bleeds off is noted. If there is substantially no pressure bleed off the squeeze job is complete, the zone of loss is sealed, and drilling proceeds. If not, the process may be repeated. If during subsequent drilling another circulation loss is encountered, the process of our invention may be applied to the new point of loss.

The sealing action of the compostion formed at the zone of circulation loss is enhanced because the amount of water commingled into the squeeze mixture is much less than that necessary for complete hydration of the bentonite. Consequently, any aqueous drilling fluid or filtrate which subsequently invades the mixture in the zone of circulation loss causes further hydration with a resultant further hardening and swelling of the composition. This delayed hydration effects further strengthening of the seal if the seal should subsequently develop any tendency to leak. The presence of the inert liquid, and particularly diesel oil, in the partially hydrated bentonite resulting from mixing the squeeze mixture and the aqueous liquid provides a liquid phase between globules of the partially hydrated material to give a thick plastic mass that can be squeezed into the fissures in the incompetent formation. Without the inert liquid, bentonite, for example, upon hydration quickly forms a rigid mass.

The foregoing process and composition may be used if the circulation loss occurs only under high pressure in which case the hole will usually hold drilling fluid. In case the leak in region 22 is very severe it may be found impossible to hold the well full of drilling fluid. Such a condition, of course, makes it difficult to pump the correct amount of drilling fluid down the annular space to properly commingle with the squeeze mixture. Accordingly, when such a condition is encountered we prefer to apply our method by setting a packer on the lower end of the drill pipe or tubing. In this manner the drill pipe may be sealed against either the open hole or the casing. In performing the process of our invention under these conditions, alternate small slugs of the squeeze mixture from tank 23 and of aqueous fluid from tank 20 are pumped down the drill pipe 13 and displaced into the zone of circulation loss. In order to keep the squeeze mixture and aqueous fluid from mixing in the drill pipe, each slug is preceded and followed by a barrel or two of plain diesel oil. In this manner the alternate slugs of squeeze mixture and drilling fluid are maintained separated until they reach the end of the drill pipe, where commingly takes place as the slugs progress down the hole and into the zone 22 of circulation loss. The effects of this type of application of our invention are the same as that previously described. After the alternate slugs have been spotted in the desired location, commingled, and further pumped back into the formation by the further introduction of drilling fluid, the well is allowed to stand for several hours in order that the seal may strengthen before drilling is resumed. In practicing the invention in this manner the aforementioned ratio of squeeze mixture and drilling fluid, namely 4 parts of squeeze mixture to 1 part of drilling fluid is preferred. Slugs of about 20 barrels of squeeze mixture are accordingly alternated with slugs of 5 barrels of aqueous drilling fluid, the slugs being separated in the drill pipe by about ½ barrel of plain diesel oil.

In describing the process of our invention, the drawing shows the tanks, pumps, etc., in a diagrammatic form only. Ordinarily, it is convenient to employ conventional well-cementing equipment in carrying out the steps of our invention, such equipment usually being mounted on trucks, and comprising the necessary valves, pressure gauges, meters, mixing hoses, calibrated tanks, calibrated pumps, etc., so that by this means our invention may be carried out expeditiously. Furthermore, while the drawing shows one arrangement of equipment for carrying out the process of our invention, it is to be understood that other means for performing the operations may be employed.

By way of example, but not to limit our invention, the following is a description of how our invention was applied to a particular well in the Gulf Coast area. The well was being drilled at a depth of 9827 feet with 14.0 pounds per gallon (p.p.g.) drilling fluid when the well lost circulation. Circulation was regained with a 12.0 p.p.g. mud and the use of 7 pounds per barrel of sealing agents of the types generally used, but because of higher pressures expected in later drilling it was necessary that the hole be able to support a drilling fluid of 15.0 to 15.5 p.p.g. density. By use of a spinner-type flow meter survey, the point of loss was found to be at 9632 feet. With a 13.3 p.p.g. mud density the well would take fluid with 400 p.s.i. surface pressure. This gave a bottom-hole pressure equivalent to that of a drilling-fluid density of only 14.1 p.p.g. and indicated that additional sealing was required.

The bit was placed at 9591 feet. Two cementing trucks were used. These were connected to the drill pipe and the lines pressured with water. The truck equipment was drained of water and flushed by displacing 3 barrels of diesel oil into the drill pipe. The squeeze mixture was then mixed in the measuring tanks of each truck, using 14.2 barrels of diesel oil, 43 sacks of bentonite, 2 sacks of cellophane strips, and 2 sacks of fine mica in each. This gave a total of 40 barrels of squeeze mixture containing 303 pounds of bentonite per barrel of diesel oil and 10 pounds of sealing material per barrel of squeeze mixture.

The 40 barrels of squeeze mixture were displaced into the drill pipe and the truck measuring tanks cleaned with 3 barrels of diesel oil. This was also displaced into the drill pipe. One truck then pumped in 84 barrels of aqueous mud, which placed the first oil at the bit, and the blow-out preventer (10) was closed. The formation was broken down with 375 p.s.i. pressure as measured by a pressure gauge (29) connected to the casing.

One truck pumped 50 barrels of aqueous mud down the drill pipe while the other pumped 13 barrels of aqueous mud down the annulus through pipe 19. This mixed aqueous mud into the squeeze mixture at a 1:3.85 ratio as it passed through the bit and left 2 barrels of diesel oil in the drill pipe at the end of the operation. Three barrels of diesel oil remained in the open hole down to the point of loss, and 1 barrel had been displaced into the point of loss. Pumping was at such a rate that 3.7 barrels of fluid were displaced into the formation each minute during most of the squeeze, but this was slowed to a very slow rate for the last part of the squeeze. Casing pressure readings were taken as each 5 barrels of mud were forced into the drill pipe. These were:

| Barrels of mud squeezed into drill pipe: | Casing pressure (p.s.i.) |
|---|---|
| 0 | 375. |
| 5 | 425. |
| 10 | 510. |
| 15 | 700. |
| 20 | 950. |
| 25 | 1025. |
| 30 | 1200. |
| 35 | 1300. |
| 40 | 1550. |
| 45 | 1750. |
| 50 | 2000 (final and maximum). |

The final pressure bled slowly to 1150 p.s.i. in 15 minutes and to 800 p.s.i. in 1 hour.

The hole was reamed out to 9633 feet. It was necessary to use 3000 to 8000 pounds weight on the bit to drill from 9621 to 9633 feet. At this point the formation was tested with 1100 p.s.i. pressure and this slowly bled to 1050 p.s.i. The hole was cleaned out to total depth. The bridging from the sealing composition continued hard to 9794 feet and the hole was cleaned from this point to total depth. The open hole was then tested with and held 1150 p.s.i. pressure, which, when added to the hydrostatic pressure of a 13.3 p.p.g. mud at the point of loss of 9633 feet, is equivalent to the desired 15.5 p.p.g. drilling fluid. Drilling was then resumed.

While we have termed the concentrated mixture of bentonite in diesel oil as the squeeze mixture, this is for purpose of description only. It is apparent that the sealing action is accomplished by the product or products of interaction between the squeeze mixture and the aqueous drilling mud. This interaction effects a swelling, hardening, adhesion to the formation, and cohesion of the mass, through the hydration of the hydratable material in the squeeze mixture. By the process of our invention the sealing material is formed in situ at the point of circulation loss, and thereby attains maximum efficiency.

We have described our invention as applied to cure circulation loss whose origin lies in a formation which has been broken down by excess pressure. Our invention is also applicable to cure circulation losses in highly porous or cavernous formations. In such cases it is generally necessary to introduce larger quantities of the squeeze mixture and drilling mud and it is also preferable to build up the concentration of hydratable material in the squeeze mixture to as high a value as possible. This may be done by the inclusion of pellets of bentonite as previously mentioned.

This application is a continuation-in-part of our application Serial No. 255,442, filed November 8, 1951, now abandoned, and entitled "Method of and Composition for Sealing Lost Circulation in Wells."

We claim:

1. A process for sealing a zone of circulation loss into an incompetent formation encountered in drilling a well comprising pumping a slurry of a non-aqueous liquid and hydratable material down the well through one channel into the borehole slightly above the zone of circulation loss, the concentration of hydratable material in said slurry being between about 100 pounds per barrel of non-aqueous liquid and the maximum concentration allowing a slurry to be pumpable, simultaneously pumping an aqueous liquid down the well through a separate channel into the borehole slightly above the zone of circulation loss, the ratio of slurry to aqueous liquid being between a maximum of 10:1 and a minimum equal to the ratio at which the aqueous liquid will completely hydrate the hydratable material, one of the slurry and the aqueous liquid containing particles of a plugging agent, mixing the slurry and the aqueous liquid in the borehole slightly above the zone of circulation loss to partially hydrate the hydratable material to form a stiff, viscous mass of partially hydrated hydratable material and plugging agent in the borehole, and pumping a liquid into the well to displace the stiff, viscous mass into the openings in the formation causing circulation loss.

2. A process for sealing a zone of circulation loss into an incompetent formation encountered in drilling a well comprising displacing a slurry of non-aqueous liquid and a hydratable material down a well through one channel into the borehole slightly above the zone of circulation loss, the concentration of hydratable material in said slurry being between about 100 pounds per barrel of non-aqueous liquid and the maximum concentration allowing a slurry to be pumpable, simultaneously displacing an aqueous liquid down the well through a separate channel into the borehole slightly above the zone of circulation loss, the ratio of slurry to aqueous liquid being between a maximum of 10:1 and a minimum equal to the ratio at which the aqueous liquid will completely hydrate the hydratable material commingling in the borehole, the streams of the slurry and the aqueous liquid discharged from the channels to form a stiff, highly viscous mass of partially hydrated hydratable material in the borehole adjacent the zone of circulation loss, continuing displacement of the slurry and the aqueous liquid from the channels into the borehole to continue mixing and displace partially hydrated hydratable material from the borehole into the openings in the formation causing circulation loss, and maintaining pressure on the partially hydrated hydratable material to harden it.

3. A process for sealing a zone of circulation loss into an incompetent formation encountered in the drilling of a well comprising pumping a spacer of non-aqueous liquid down a first channel in a well into the borehole slightly above the zone of circulation loss to displace aqueous liquid from the first channel, pumping a hydratable material suspended in a non-aqueous liquid down the first channel into the borehole slightly above the zone of circulation loss, the concentration of hydratable material in said slurry being between about 100 pounds per barrel of non-aqueous liquid and the maximum concentration allowing a slurry to be pumpable, simultaneously pumping an aqueous liquid down a second channel separated from the first channel into the borehole slightly above the zone of circulation loss, the ratio of slurry to aqueous liquid being between a maximum of 10:1 and a minimum equal to the ratio at which the aqueous liquid will completely hydrate the hydratable material following the suspension of the hydratable material in the non-aqueous liquid with a spacer of a non-aqueous liquid, following the spacer of non-aqueous liquid with an aqueous liquid to displace the suspension of hydratable material and non-aqueous liquid from the first channel, mixing the hydratable material and the aqueous liquid delivered through the second channel in the borehole to form a stiff, highly viscous mass of partially hydrated hydratable material in the borehole, and continuing the pumping of aqueous liquid into the well to displace the partially hydrated hydratable material from the borehole into openings in the formation causing circulation loss.

4. In a process for recovering circulation lost in a formation penetrated by a drilling well which includes injecting into said well through a first conduit a non-aqueous liquid slurry of finely divided bentonite, injecting into said well through a second conduit an aqueous drilling fluid, intimately mixing said non-aqueous liquid slurry of finely divided bentonite and said aqueous drilling fluid within said well at a depth substantially as great as the depth of said formation, the amount of said finely divided bentonite being sufficient to produce a non-fluid mass of hydrated bentonite, and displacing at least a part of said non-fluid mass of hydrated bentonite into said formation, the improvement comprising adding to one of said non-aqueous liquid slurry of finely divided bentonite and said aqueous drilling fluid before injecting it into said well about 38.5 pounds of solid particles of plugging material per barrel of said aqueous drilling fluid to produce a composition which readily plugs flow channels in said formation.

5. A process for recovering circulation lost in a formation penetrated by a drilling well including injecting into said well through the drill pipe a non-aqueous liquid slurry of finely divided bentonite, injecting into said well through the annular space between said drill pipe and the casing in said well an aqueous liquid, intimately mixing said non-aqueous liquid slurry of finely divided bentonite and said aqueous liquid within said well at a depth substantially as great as the depth of said formation by jetting said non-aqueous liquid slurry of finely divided bentonite into a moving stream of said aqueous liquid, the concentration of said finely divided bentonite in said slurry being in the range of 300 to 400 pounds per barrel of said non-aqueous liquid and the ratio of said non-aqueous liquid slurry of finely divided bentonite being in the range of about 3.85–8 parts by volume to one part by volume of said aqueous liquid injected into said well, adding to one of said non-aqueous liquid slurry of finely divided bentonite and said aqueous liquid before injecting it into said well about 38.5 pounds of solid particles of plugging material per barrel of said aqueous liquid whereby said non-aqueous liquid slurry of finely divided bentonite, said aqueous liquid, and said plugging material produce within said well a non-fluid composition, and then displacing said composition into highly permeable flow channels in said formation to plug said flow channels and permit recovery of circulation.

6. A process for sealing a zone of drilling fluid loss into an incompetent formation encountered in drilling a well comprising pumping a pumpable slurry of a hydratable material in an inert non-aqueous liquid down into the well through one channel in the well, said slurry containing hydratable material in a concentration between about 100 pounds per barrel of non-aqueous liquid and the highest concentration permitting a slurry to be pumpable, simultaneously pumping an aqueous liquid down into the well through a separate channel, the ratio of slurry to aqueous liquid being between a maximum of 10:1 and a minimum equal to the ratio at which the aqueous liquid will completely hydrate the hydratable material, mixing the slurry and the aqueous liquid in the borehole of the well slightly above the zone of loss to partially hydrate the hydratable material and form a stiff, highly viscous mass of partially hydrated hydratable material in the borehole, pumping a liquid into the well to displace and squeeze partially hydrated material from the borehole into openings in the formation causing loss of drilling fluid, and maintaining pressure on the partially hydrated material to harden it.

7. A process as set forth in claim 6 in which the hydratable material is a hydratable clay.

8. A process as set forth in claim 6 in which the hydratable material is bentonite.

9. A process as set forth in claim 6 in which the concentration of hydratable material in the slurry is in the range of 100 to 400 pounds per barrel of non-aqueous liquid.

10. A process as set forth in claim 6 in which the concentration of hydratable material in the slurry is between about 250 and about 300 pounds per barrel of non-aqueous liquid.

11. A process as set forth in claim 6 in which the ratio of slurry to aqueous liquid is about 4:1.

12. A process as set forth in claim 6 in which the non-aqueous liquid is a hydrocarbon oil.

References Cited in the file of this patent

UNITED STATES PATENTS

| | | |
|---|---|---|
| 1,807,082 | Boynton | May 26, 1931 |
| 2,065,512 | Cannon | Dec. 29, 1936 |
| 2,259,875 | Bent et al. | Oct. 21, 1941 |
| 2,609,880 | Dyer | Sept. 9, 1952 |
| 2,634,098 | Armentrout | Apr. 7, 1953 |
| 2,672,301 | Lorenz | Mar. 16, 1954 |
| 2,800,964 | Garrick | July 30, 1957 |
| 2,801,077 | Howard et al. | July 30, 1957 |

UNITED STATES PATENT OFFICE
CERTIFICATE OF CORRECTION

Patent No. 2,990,016             June 27, 1961

William C. Goins, Jr., et al.

It is hereby certified that error appears in the above numbered patent requiring correction and that the said Letters Patent should read as corrected below.

Column 1, lines 39 and 40, strike out "whereare removed from the drilling fluid by screens,"; line 58, for "filteration" read -- filtration --; column 4, line 64, for "cmmonly" read -- commonly --; column 12, line 13, for "2,672,301" read -- 2,672,201 --.

Signed and sealed this 21st day of November 1961.

(SEAL)
Attest:

ERNEST W. SWIDER
Attesting Officer

DAVID L. LADD
Commissioner of Patents
USCOMM-DC